United States Patent [19]

Dieulesaint et al.

[11] 4,272,676
[45] Jun. 9, 1981

[54] OPTICAL-PICKUP COORDINATOMETER

[75] Inventors: Eugène Dieulesaint; Daniel Royer; Richard Guedj, all of Paris, France

[73] Assignee: Thomson-CSF, Paris, France

[21] Appl. No.: 93,137

[22] Filed: Nov. 9, 1979

[30] Foreign Application Priority Data

Nov. 10, 1978 [FR] France .................. 78 31861

[51] Int. Cl.³ .......................................... G01D 21/04
[52] U.S. Cl. .................................. 250/221; 250/222 R
[58] Field of Search .................. 250/221, 222 R; 350/358

Primary Examiner—David C. Nelms
Assistant Examiner—Darwin R. Hostetter
Attorney, Agent, or Firm—Cushman, Darby & Cushman

[57] ABSTRACT

An optical pickup which performs the function of a light pen is capable of point detection of elastic waves propagated by electrochemical transducers in a direction parallel to the surface of a writing table. The table is constituted by a plate of refractive material placed within an optical polarizing cell which prevents emergence of incident radiation produced by a light source. The pickup receives that portion of the radiation which emerges from the cell by virtue of the birefringence induced within the plate by the elastic wave trains issuing from the transducers.

12 Claims, 6 Drawing Figures

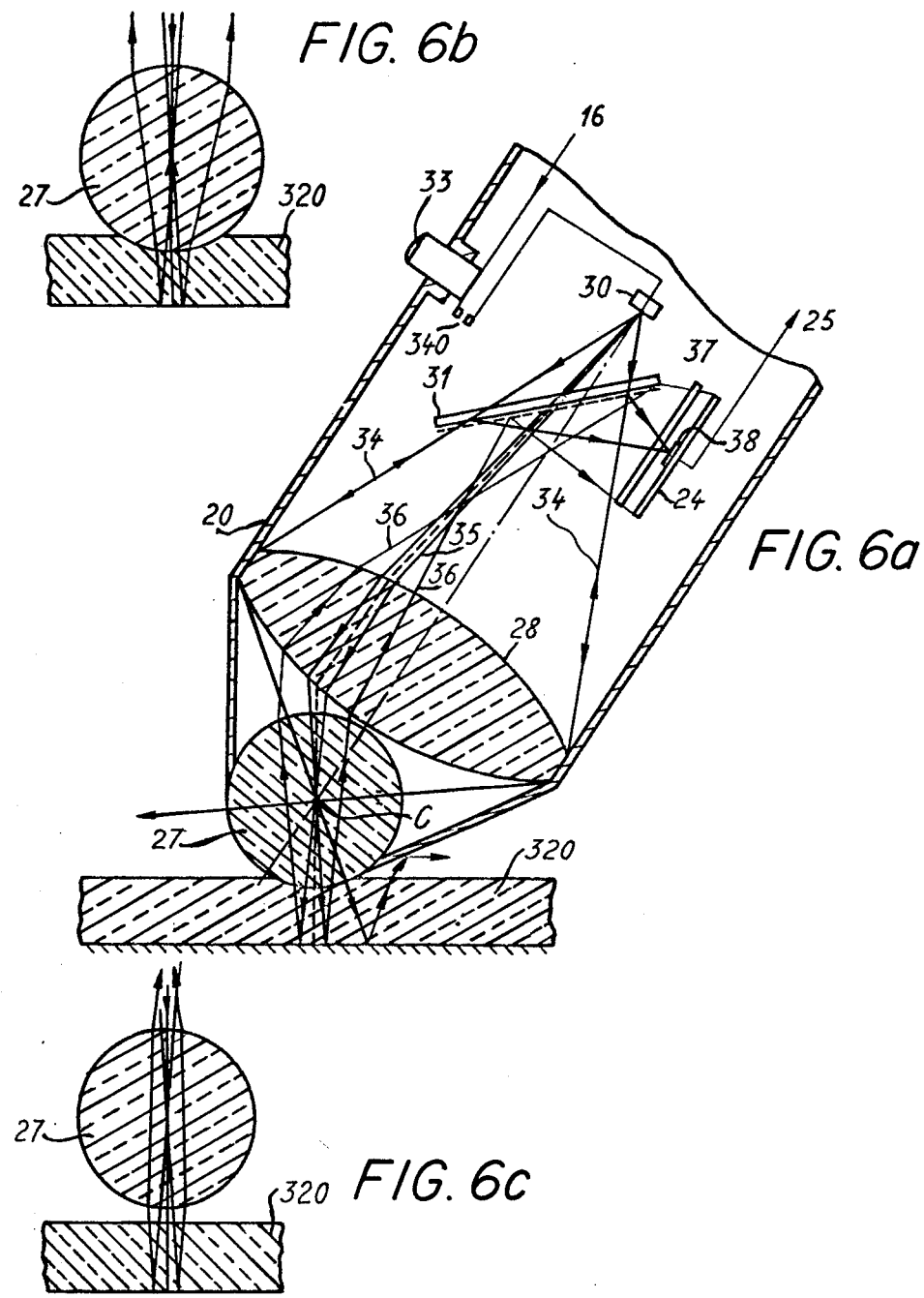

OPTICAL-PICKUP COORDINATOMETER

This invention relates to devices which serve to acquire graphic data either for remote transfer or for utilization by a data-processing machine. This data acquisition operation calls for real-time measurement of the coordinates of a series of points. These points can be marked as dots on a writing table by means of the point of a stylus or selected by sampling of a line plotted on the table.

Data acquisition devices based on the measurement of an electric potential difference are already in existence but have low resolution capability. Higher resolution can be obtained by means of an elastic surface wave coordinatometer. However, this technique entails the use of a table cut in a piezoelectric crystal, thus limiting its surface area. Moreover, the fact of applying one's hand on a surface on which elastic surface waves are traveling is liable to give rise to disturbances and the electrical operation of the associated sensor does not permit of its use as a light pen in conjunction with a data display console.

In order to overcome these disadvantages, the invention utilizes the optical detection of elastic waves which propagate within a refractive medium. Thus the writing table can have a relatively large surface area, the measuring stylus can perform the function of a light pen and the disturbing effect of an object placed on the table becomes insignificant.

The invention is directed to an optical-pickup coordinatometer comprising a writing table provided with electromechanical transducer means for propagating elastic-wave trains in a direction parallel to the table surface, a pickup which is capable of point detection of the passage of elastic waves when it rests on the table and chronometric means for determining each coordinate by measuring the time taken by the elastic-wave trains to travel over the corresponding distance. The invention is distinguished by the fact that the writing table is constituted by a plate of refractive material placed within an optical polarizing cell. Said cell is so arranged as to prevent emergence of incident radiation produced by a source. The pickup mentioned above is an optical device for receiving that portion of the radiation which emerges from the optical cell by reason of the birefringence induced within the plate by the volume elastic-wave trains issuing from the electromechanical transducer means.

A more complete understanding of the invention will be gained from the following description and from the accompanying drawings in which:

FIGS. 5 and 6 are explanatory diagrams.

Figure 1:
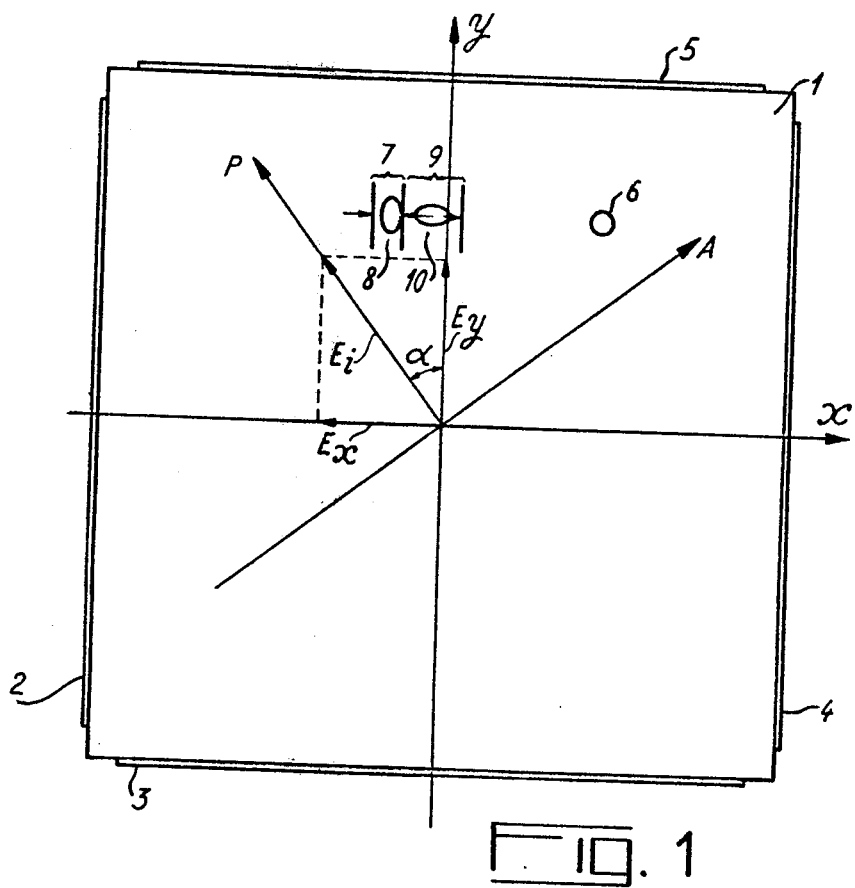
FIG. 1 is a plan view of a plate having parallel faces and cut from refractive material.

In FIG. 1, there is shown a plate 1 which has been cut from refractive material. The principal faces of the plate 1 are parallel to the plane of the figure as determined by the x and y axes. The lateral faces of the plate 1 are perpendicular in pairs to the x and y axes. Said faces are adapted to carry electromechanical transducers 2 and 3 which emit volume elastic waves within the plate 1. The waves emitted by the transducers 2 and 3 propagate respectively in the positive directions of the x and y axes until they reach the absorbent coatings 4 and 5 which prevent reflection of said waves.

If it is assumed that no mechanical stress is produced by the transducers 2 and 3 and that the plate 1 is cut from isotropic material such as silica, then the refractive index is the same in all the directions of the space. This state can be represented by drawing a sphere 6 which is known as an index sphere. The result achieved by isotropy of refractive properties is that the state of polarization of an incident optical radiation is maintained as it passes through the thickness of the plate 1.

If it is assumed on the contrary that a mechanical stress is produced, for example, by a longitudinal elastic wave emitted by the transducer 2, then in that case the optical properties of the medium are modified. In a compressed region 7, the index sphere is converted to an ellipsoid 8 whose major axis is parallel to y; and, in an elongated region 9, there is obtained an ellipsoid of the indices 10 in which the major axis is parallel to x. This phenomenon, known as induced birefringence, converts the plate 1 to a birefringent medium in which the x and y axes are the neutral lines. When polarized radiation passes through a birefringent medium, its state of polarization is modified unless the polarization is rectilinear and parallel to one of the neutral lines. In order to visualize the elastic waves propagated within the plate 1, the invention proposes to place said plate within an illuminated polarizing cell in which the elements are so arranged as to prevent any emergence of incident radiation if the plate 1 is not subjected to any stress. It is possible for example to mount the plate 1 between crossed polarizers with directions of polarization P and A which form an angle $\alpha$ with the neutral lines y and x. An incident polarizing radiation $E_y$ is made up of components $E_x$ and $E_y$ which undergo induced birefringence in the form of a path difference $\delta$. The radiation which emerges from the plate 1 exhibits a state of polarization which differs from a rectilinear polarization oriented at right angles to A. Said radiation can therefore pass partially through the analyzer having a direction A which forms the exit face of the polarizing cell.

Figure 2:
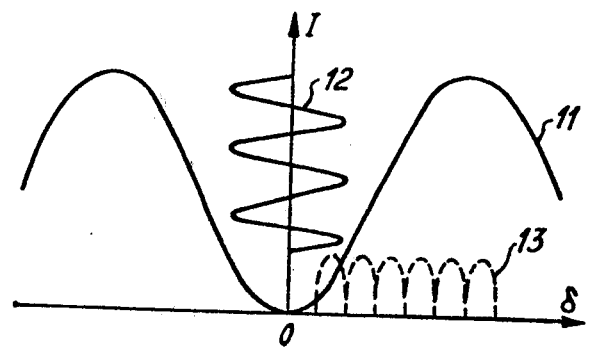
FIG. 2 is an explanatory diagram.

FIG. 2 is an explanatory diagram which shows the law of variation 11 of the intensity I of the radiation which emerges from a crossed polarizing cell when a mechanical stress produces within the plate 1 a path difference $\delta$. Under conditions of zero stress, the path difference $\delta$ and the intensity I are zero. An undulatory stress as designated by the reference 12 and arising from propagation of an acoustic wave within the plate 1 produces pulsatory emergent radiation 13 which is readily detectable by means of an optical pickup device. The intensity of the emergent radiation varies proportionally to $\sin^2 2\alpha$ and to $\sin^2 \pi\delta/\lambda$, where $\lambda$ is the optical wavelength.

The path difference $\delta$ depends on the width l of the elastic wave beam and on the difference $\Delta n$ of the indices $n_x$ and $n_y$ of the medium in the case of luminous vibrations, the vectors of which are respectively parallel to the x and y axes. By choosing $\alpha = \pi/4$, the detection effect is at a maximum in the case of waves which propagate in the directions of x and y axes. The induced birefringence measured by the difference $\Delta n$ between the indices $n_x$ and $n_y$ depends on the magnitude of the stress C applied to the plate 1 and on the nature of the medium which constitutes this latter.

In the case of a traveling elastic wave having an angular frequency w, the differential phase shift produced by the plate can be written in the form:

$$\Delta y = \frac{2\pi \cdot 1 \cdot \Delta n}{\lambda} \sin [w(t - \frac{x}{V})]$$

where x is the abscissa in the direction of propagation and V is the propagation velocity of the elastic wave.

In more general terms, there exists a birefringence effect which is optically detectable irrespective of the shape of the propagated wave.

Figure 3:
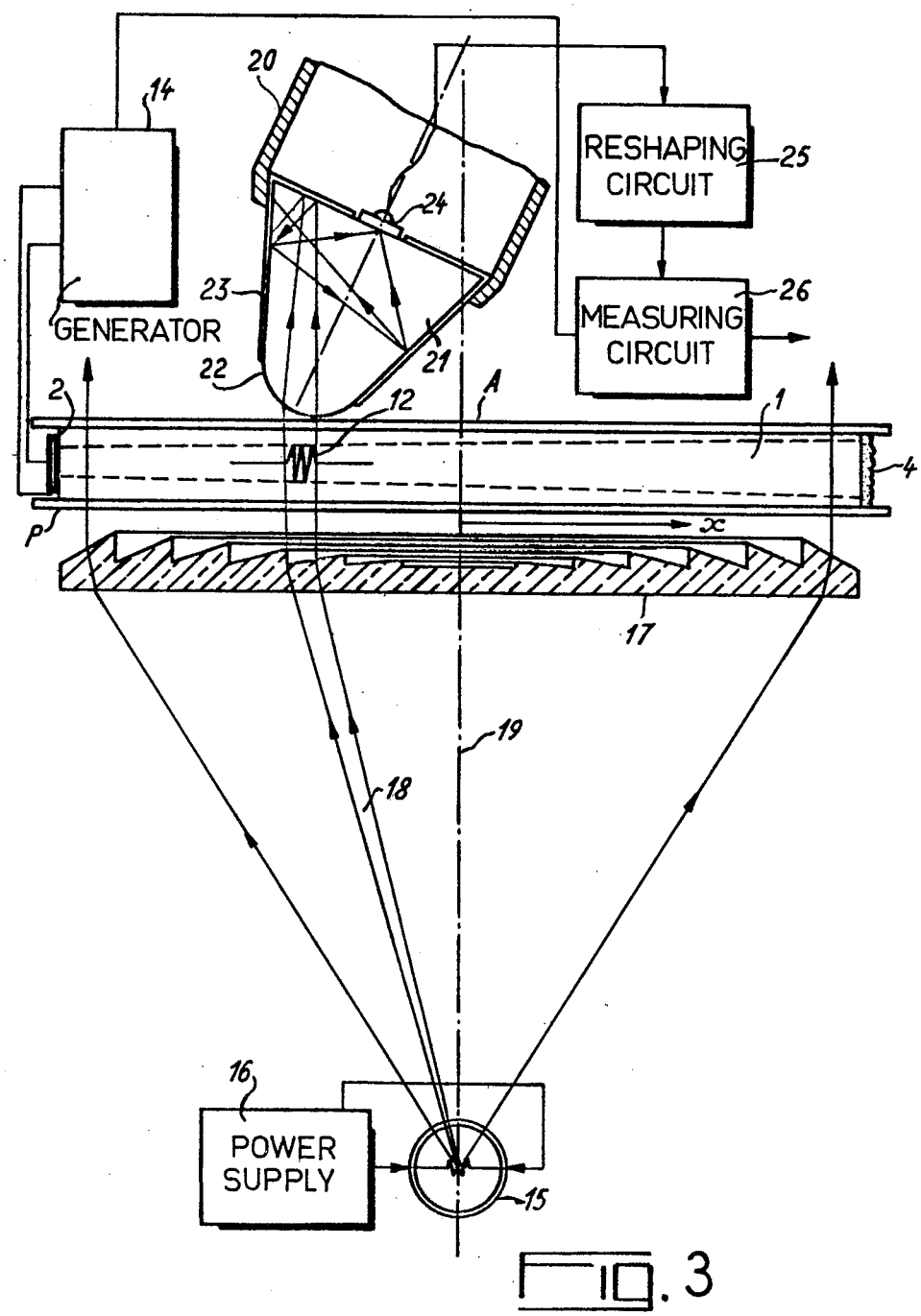
FIG. 3 illustrates a first form of construction of the coordinatometer according to the invention.

In FIG. 3, there is shown a first form of construction of the coordinatometer according to the invention. The tip of which has been drawn to a considerably larger scale in FIG. 3. Broadly speaking, the optical pickup device is comparable with a pencil which can be used for plotting any desired graphic presentation on the writing table or for marking points thereon.

In order to carry out optical detection which has low sensitivity to localization errors which may result from inclination of the pickup body, the lower end of said pickup body is fitted with a cone-shaped tip 21, the base of which is set in the cylindrical body 20. The extremity 22 of the tip has the shape of a spherical segment. The conical wall of the tip and its base are provided with an opaque coating 23 having both reflecting and light-scattering properties. Said coating 23 is interrupted at the tector 24 or else it can be constituted by the coating 21, the reflection of which can be made selective.

By way of example of construction, it is possible to employ a plate 1 of silica which has a square shape and a useful surface area in the vicinity of 100 cm². The elastic waves are longitudinal volume waves having a frequency of 40 MHz. The emission is constituted by a train of pulses having a duration of 0.5 μs and a recurrence frequency of the order of 20 kHz in the case of each measuring axis.

The device of FIG. 3 operates by transmission and consequently requires illumination of the entire table surface. In consequence, the greater part of the radiation emitted by the source 15 is not employed at the level of the detector 24. Moreover, the formation of a collimated beam calls for the use of a field lens 17 in which both the dimensions and the focal distance are of appreciable value. The lighting system is therefore of substantial overall size and the device proves costly.

In order to overcome these disadvantages, the invention makes it possible to incorporate both the lighting means and the photodetecting means within the optical pickup unit. The polarizing cell operates on a different principle which entails the use of monochromatic radiation.

Figure 4:
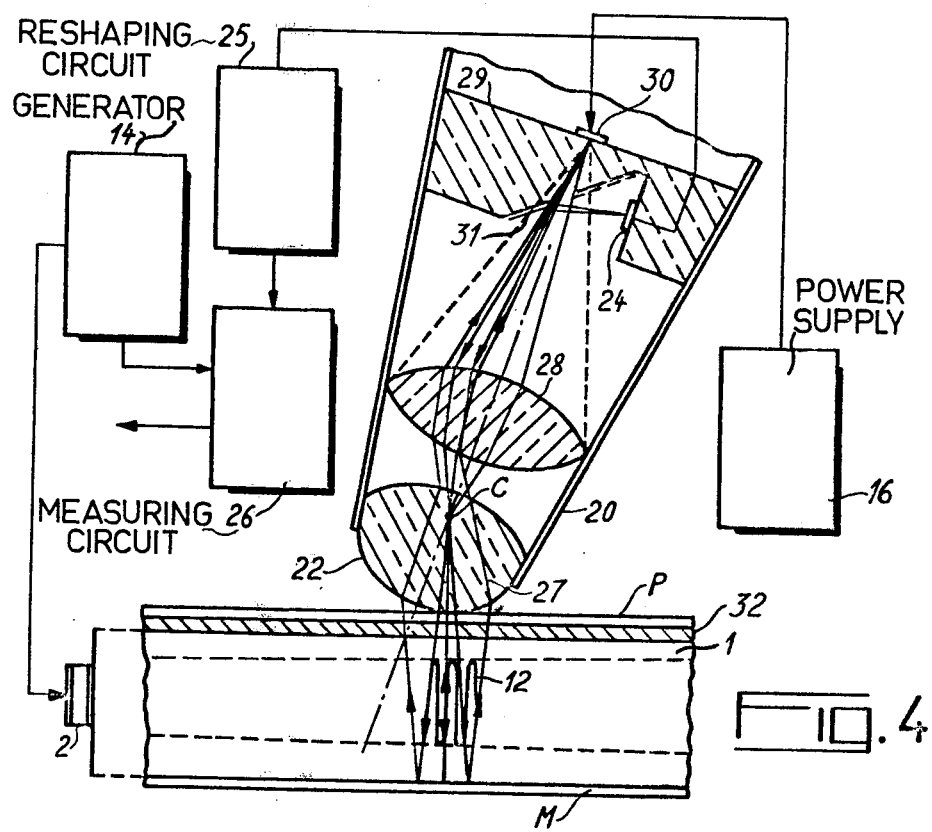
FIG. 4 illustrates a second form of construction of the coordinatometer according to the invention.

In FIG. 4, there is shown a diagram of a coordinatometer which operates on the reflection principle. The same references designate the same elements as in FIG. 3.

Figure 5:
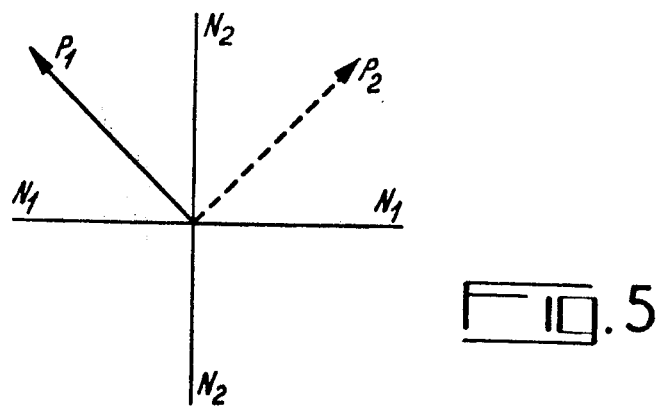

The polarizing cell is provided on the side nearest the optical pickup with a polarizer P, the direction of polarization $P_1$ of which is indicated in the diagram of FIG. 5. The radiation emanating from the optical pickup is reflected back to this latter by means of a mirror M. A quarter-wave birefringent plate 32 has been placed between the polarizer P and the mirror M. The neutral lines $N_1 N_1$ and $N_2 N_2$ of the quarter-wave plate 32 are oriented at 45° to the direction of polarization $P_1$ imposed on the monochromatic incident radiation; this configuration is illustrated in FIG. 5. When no elastic wave is propagated by the refractive plate 1, the radiation reflected by the mirror M has been subjected to a path difference equal to one half-wavelength when it reaches the polarizer P. The polarization is rectilinear but its direction $P_2$ is in quadrature with the polarization which is allowed to pass through the polarizer P. In consequence, no radiation emerges from the polarizing cell.

On the other hand, if the plate 1 is subjected to an elastic stress, the induced birefringence effect modifies the path difference and a fraction of the incident radiation may emerge from the polarizing cell. The emergent radiation comes from the zone in which the elastic wave 12 is located.

The difference between this optical pickup and the pickup shown in FIG. 3 lies in the presence of a radiation source 30 which is constituted by a photoemissive diode, for example. The source 30 is carried by a transparent support 29 provided with a semi-reflecting facet 31. A collecting lens 28 forms a reduced image of the source at the point C of the exit lens 27. The outer face of the lens 27 consists of a surface which is cut in the shape of a spherical segment having a center C. This arrangement makes it possible to collect radiation which is close to the normal incidence of the mirror while at the same time permitting the possibility of inclining the pickup with respect to the writing table.

FIG. 6 illustrates in greater detail the operation of the reflection pickup of FIG. 4. For the sake of simplicity, the writing table together with all its elements is designated by a single reference 320. The other references of FIG. 6(a) designate the same elements as in FIG. 4, except for an opaque pastille 38 placed at the center of the photodetector 24, a monochromator filter 37, a contact 340 and a control push-button 33. The push-button 33 performs the function of enabling means for the acquisition of data and initiates turn-on of the photoemissive diode 30 by means of the contact 340. The diode 30 emits a wide-angle beam 34 of monochromatic radiation. The collecting lens 28 focuses said beam at the center C of the lens 27. Said lens 27 is a glass ball, for example. The beam which emerges from the tip of the pickup has a wide angular divergence in order to ensure that the writing table 320 can be suitably illuminated by the optical pickup in spite of changes of inclination. In the case of the inclination illustrated in FIG. 6, only the light-ray pencil 35 which has an angle of incidence close to the normal to the table 320 contains radiated energy which will be detected by the detector 24. The reflected beam 36 is directed back to the monochromator filter 37 by the semi-reflecting plate 31. Said beam 36 is received by the detector 24 except at the center where provision has been made for an opaque pastille 38 which performs the function of a spatial filter. In fact, the outer spherical face of the tip of the pickup constitutes a reflecting dioptric element which forms a parasitic image of the source 30 at the center of the detector 24. The pastille 38 blocks said parasitic radiation without preventing detection of the radiation which emerges from the table 320. It is apparent from FIG. 6(a) that the ball 27 penetrates to a slight extent into the refractive material which has a lower degree of hardness and constitutes the top surface of the table 320. The path of the light rays as shown in FIG. 6(a) is the path obtained when the refractive index of the ball 27 is equal to the index of the medium constituting the top surface of the table 320. The zone of contact of the ball does not give rise to any refraction of the rays.

FIG. 6(b) shows the path of the rays in the case of a table 320 whose writing face is formed of material having higher refractivity than the material of the ball 27. The deformed zone behaves as a negative lens and the diametrically opposite zone forms a positive lens. FIG. 6(c) shows the change which has taken place when the ball 27 is held at a short distance above the table. The effect of convergence becomes more marked since the two zones of the ball which transmit the reflected radiation act as positive lenses. In consequence, any loss of contact can be detected spatially at the level of the detector 24. It is in fact necessary to ensure that a line having interruptions provides data which indicate such interruptions. This result can be obtained manually by means of the validation control push-button 33 or automatically by means of the counting indications. The filter 37 serves to protect the system against the influence of ambient light. It is worthy of note that there is nothing to prevent the ball from rotating freely within its housing in order to facilitate sliding motion.

What is claimed is:

1. An optical-pickup coordinatometer comprising a writing table provided with electromechanical transducer means for propagating elastic-wave trains in a direction parallel to the table surface, a pickup which is capable of point detection of the passage of elastic waves when it rests on the table and chronometric means for determining each coordinate by measuring the time taken by the elasticwave trains to travel over the corresponding distance, wherein the writing table is constituted by a plate of refractive material placed within an optical polarizing cell, said cell being so arranged as to prevent emergence of incident radiation produced by a source, said pickup being an optical device for receiving that portion of the radiation which emerges from the optical cell by reason of the birefringence induced within the plate by the volume elastic-wave trains issuing from said electromechanical transducer means.

2. A coordinatometer according to claim 1, wherein the optical polarizing cell comprises a crossed polarizer and analyzer in which the directions of polarization are at an oblique angle with respect to the directions of propagation of the elastic-wave trains, the optical pickup being located on one side of the optical cell and the radiation source being adapted to illuminate the other side of the optical cell in a substantially normal plane of incidence.

3. A coordinatometer according to claim 1, wherein the optical polarizing cell comprises a polarizer and a mirror, wherein said polarizer cooperates with a quarter-wave plate which is incorporated in said cell and the neutral lines of which are oriented at 45° to the direction of polarization of said polarizer, the source of radiation being a monochromatic source incorporated in the optical pickup.

4. A coordinatometer according to claim 1, wherein the extremity of the pickup which rests on the table is fitted with a sensing element having a spherical end and optically coupled with a photodetector element.

5. A coordinatometer according to claim 2, wherein the optical pickup is provided with means for integrating the luminous flux received.

6. A coordinatometer according to claim 3, wherein the optical pickup is provided at its extremity with a lens whose outer face is cut in the shape of a spherical segment, the radiation emitted by the source being focused at the center of curvature of said segment, a semi-reflecting plate being located on the path of the radiation emanating from the source in order to transmit to a photodetector element that portion of the radiation which is reflected from the writing table and received by the lens.

7. A coordinatometer according to claim 6, wherein optical means for spatial filtering are associated with the photodetector element in order to make said element insensitive to parasitic images resulting from internal reflections.

8. A coordinatometer according to claim 6, wherein the lens is a ball.

9. A coordinatometer according to claim 8, wherein the ball is capable of rotating freely within its housing.

10. A coordinatometer according to claim 1, wherein the elastic waves exchanged are either longitudinal or transverse waves.

11. A coordinatometer according to claim 10, wherein said coordinatometer is provided with a data-acquisition validation control element.

12. A coordinatometer according to claim 11, wherein said control element is mounted on the body of the optical pickup.

* * * * *